United States Patent [19]

Marshall

[11] Patent Number: 4,913,410
[45] Date of Patent: Apr. 3, 1990

[54] PARTICLE FOR VIBRATION DAMPING

[76] Inventor: Robert L. Marshall, 1020 NE. 26th Ave., Pompano Beach, Fla. 33062

[21] Appl. No.: 247,948

[22] Filed: Sep. 22, 1988

Related U.S. Application Data

[63] Continuation of Ser. No. 1,178, Jan. 7, 1987, abandoned.

[51] Int. Cl.[4] .............................. F16F 1/36; F16F 9/30
[52] U.S. Cl. ..................................... 267/153; 188/268; 248/634; 248/638; 428/95
[58] Field of Search ........................ 267/292, 153, 148; 188/268; 248/634, 638, 615, 516; 428/95, 407, 302; 264/128

[56] References Cited

U.S. PATENT DOCUMENTS

| | | | |
|---|---|---|---|
| 2,184,482 | 12/1939 | Austin et al. | 267/153 X |
| 3,606,295 | 9/1971 | Appleton | 267/153 X |
| 3,663,469 | 5/1972 | Weissmahr | 428/95 |
| 3,888,806 | 6/1975 | Kropscoti | 264/128 X |
| 4,172,168 | 10/1979 | Klaffke et al. | 428/138 |
| 4,298,418 | 11/1981 | Takagi | 264/128 X |
| 4,452,845 | 6/1984 | Lloyd et al. | 428/220 |

FOREIGN PATENT DOCUMENTS 2911319  11/1979  Fed. Rep. of Germany ...... 267/153

*Primary Examiner*—Andres Kashnikow

[57] ABSTRACT

The method of increasing the dampening and attenuation of machinery produced vibrations by interposing between the vibrating machinery and its supporting surface a composite particle pad having elastic and resilient granules or strands of rubber or rubber-like particles of natural, synthetic or elastomeric material bound together to thereby create various sized links of such particles with voids randomly spaced within such particle pad.

2 Claims, 1 Drawing Sheet

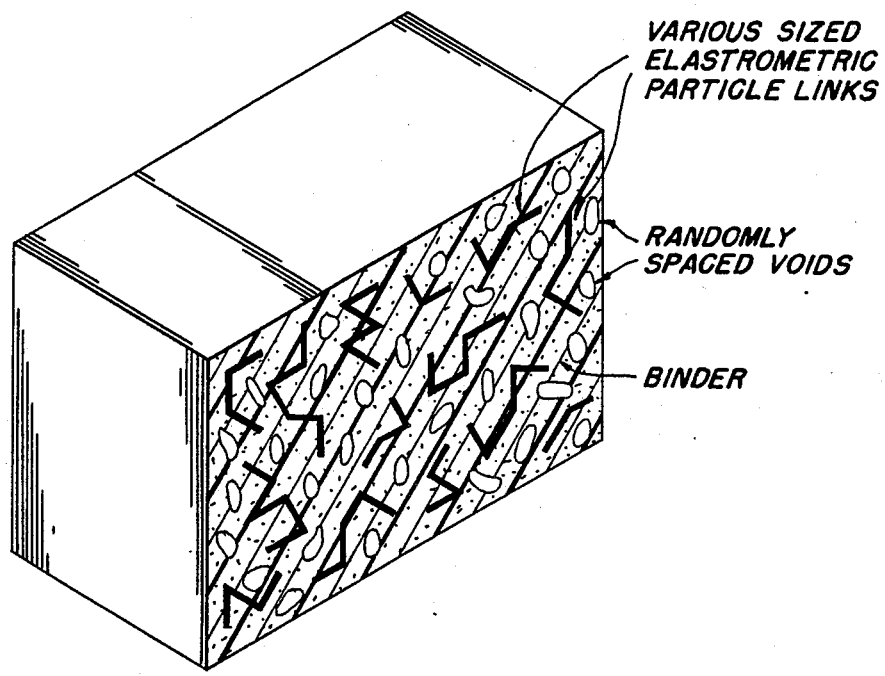

PARTICLE FOR VIBRATION DAMPING

CROSS-REFERENCE TO RELATED APPLICATIONS

This is a continuation of application Ser. No. 1,178 filed Jan. 7, 1987, now abandoned.

BACKGROUND OF THE INVENTION

1. Technical Field

This invention relates to elastic and resilient rubber or rubber-like vibration dampers or isolators used in mounting machinery that is subject to vibration due to the movement of its internal parts, such as compressors, motors, fans, etc.

2. Background

The problem in the art to which this invention apertains is the fact that conventional pads of rubber or rubber-like material do not compress or deflect sufficiently due to their stiffness with the results that such pads do not sufficiently reduce or attenuate the vibrations transmitted by machinery, and the fact that lack of sufficient compression or deflection of such pads due to their stiffness results in instability.

SUMMARY OF THE INVENTION

The object of the invention is to contribute to the solution of the discussed problems of the art by increasing the damping and attenuation of such machinery produced vibrations by interposing between the vibrating machinery and its supporting surface a composite particle pad having elastic and granular or strands of rubber or rubber-like particles of natural, synthetic or elastomeric material bound together, such as by using a urethane based binder, and thereby creating various sized links of such particles with voids randomly spaced within such particle pad.

BRIEF DESCRIPTION OF THE DRAWING

The accompanying drawing illustrates a perspective representation of the pad, which is partially cut away.

DESCRIPTION OF THE PREFERRED EMBODIMENT

Machinery produces vibrations due to its internal parts, such as compressors, motors, fans, etc. The method of this invention increases substantially the desired damping and attenuation of such machinery produced vibrations by interposing between the vibrating machinery and its supporting surface a composite particle pad having elastic and granular or strands of rubber or rubber-like particles of natural, synthetic or elastomeric stic and granular or strands of rubber or rubber-like particles of natural, synthetic or elastomeric stic and granular or strands of rubber or rubber-like particles of natural, synthetic or elastomeric stic and granular or strands of rubber or rubber-like particles of natural, synthetic or elastomeric material that is bound together, such as by using a urethane based binder, to thereby create various sized links of such particles with voids randomly spaced within such particle pad with the desired result that greater compression or deflection of such pad will be effected by such machinery concomitant with substantial increase of the damping and attenuation of the machinery produced vibrations.

Having thusly described by invention, I claim:

1. A composite for attenuating the transmission of vibrations from a machine to a support surface, consisting essentially of:
   elongate elastomeric particles selected from a group consisting of natural and synthetic rubbers; and
   a urethane-based polymer binding said particles together in various sized links in a configuration suitable for interposing between the machine and support surface, said polymer binder and particles forming voids randomly spaced among the interstices of said composite;
   whereby the composite cooperates with the machine and the support to effect a substantial attenuation of vibrations therebetween.

2. A composite particle pad for interposing between machinery and a support surface to attenuate vibrations produced by said machinery, consisting essentially of:
   strands of elastomeric particles; and
   a urethane based binder binding said strands together in various sized links and forming voids randomly spaced within said composite particle pad;
   whereby said pad cooperates with said machinery to effect damping and attenuation of said vibrations produced by said machinery.

* * * * *